United States Patent [19]

Cummins

[11] Patent Number: 5,744,051
[45] Date of Patent: Apr. 28, 1998

[54] VIBRATION DAMPING COMPOSITION

[75] Inventor: Richard F. Cummins, Lawrence, Kans.

[73] Assignee: Rosinanté, Inc., Eudora, Kans.

[21] Appl. No.: 773,404

[22] Filed: Dec. 27, 1996

Related U.S. Application Data

[60] Provisional application No. 60/009,324 Dec. 28, 1995.
[51] Int. Cl.$^6$ .................................................. E04B 1/74
[52] U.S. Cl. ............... 252/62; 106/287.17; 106/287.24; 106/287.26; 106/287.34; 106/287.35; 524/425; 524/437; 524/438; 524/442; 523/1
[58] Field of Search .................. 106/287.17, 287.23, 106/287.26, 287.24, 287.34, 287.35; 252/62; 523/1; 524/442, 444, 425, 437, 438

[56] References Cited

U.S. PATENT DOCUMENTS 5,004,764  4/1991  Yamamoto et al. .................... 523/400
5,435,842  7/1995  Mukaida et al. ........................ 524/442
5,441,657  8/1995  Wakino ..................................... 252/62

FOREIGN PATENT DOCUMENTS

52078931 A  7/1977  Japan .

*Primary Examiner*—Michael Marcheschi
*Attorney, Agent, or Firm*—Shook, Hardy & Bacon L.L.P.

[57] ABSTRACT

A vibration damping composition is provided which is made from a combination of a resin capable of being molded into a desired shape, an aggregate capable of reducing the amount of resin needed in a given volume, a structural fiber capable of increasing the strength of the composition and increasing the acoustical characteristics of the composition, and a filler material which reduces the amount of resin needed in a given volume. The resin binds the aggregate, the structural fiber and the filler material into a moldable material that, upon hardening, serves to damp vibrations.

12 Claims, No Drawings

VIBRATION DAMPING COMPOSITION

This application claims the benefit of U.S. Provisional Application No. 60/009,324, filed Dec. 28, 1995.

BACKGROUND OF THE INVENTION

This invention relates to vibration damping technology and, more particularly, to a novel vibration damping composition.

The existence of unwanted vibration is a problem common to many industries, businesses and consumers. Unwanted vibrations are particularly problematic in the construction, manufacture and use of devices having a primary function related to vibration or sound. More specifically, the damping of unwanted vibrations is of primary importance in the manufacture, production and use of sound reproduction equipment such as speakers and amplifiers.

In the construction of a speaker, the components of the speaker are held within a speaker cabinet. An ideal speaker cabinet will support the components within a vibration-free environment. This allows the speaker to produce sound without also vibrating its supporting structure, which would produce secondary vibrations. These so-called secondary vibrations impede optimum speaker performance in two ways: first, the vibrating cabinet produces its own sonic profile or sound, thereby contaminating the pure speaker sound; and second, the vibrations of the speaker reverberate to the speaker components, thereby hampering the speaker performance. Manufacturers of these speakers have sought for many years to minimize or eliminate vibrations within speaker cabinets, but have found only limited success.

Another piece of sound reproduction equipment whose performance suffers from unwanted vibration is an amplifier. Not unlike speakers, the ideal amplifier would be free from unwanted sonic interference and would be decoupled from any surrounding vibrations. Manufacturers of amplifiers have therefore reduced the level of vibrations within the amplifiers to some extent. However, further reduction of vibration within the amplifier itself, as well as isolating the amplifier from any external vibrations, would further enhance the resolution quality of the amplifier.

Unwanted vibrations cause further problems in other industries and applications beyond sound reproduction equipment. For example, unwanted vibrations can cause damage to the support structure of buildings, such as during an earthquake. Further, the accuracy of vibration-sensitive test equipment, such as optical and electronic instrumentation, can be hindered by external vibrations. Additionally, the motors and generators used on sea-going vessels may result in vibrations, including large amplitude waves. These vessels are often carrying measuring equipment, such as seismic measuring devices. The accuracy of any measuring equipment on these vessels is hindered by these vibrations. The existence of unwanted vibration is therefore a problem encountered in a great number of industries, involving many different applications.

There is, therefore, a need to provide a composition which can reduce unwanted vibrations in a number of different applications. In the industry of sound reproduction equipment, there is a need for a composition which can be used to construct speaker cabinets, bases, amplifier cabinets and bases so that unwanted vibrations are greatly reduced or eliminated, thereby enhancing the performance of the sound reproduction equipment.

SUMMARY OF THE INVENTION

It is, therefore, an object of this invention to provide a vibration-damping composition which can be used to form cabinets and bases for a variety of sound reproduction equipment so that the quality of sound reproduced is enhanced.

It is a further object of this invention to provide a vibration-damping composition that greatly reduces or eliminates unwanted vibrations, which incorporates a resin, an aggregate, a structural fiber and a filler, that can be formed into a desired shape.

Another object of this invention is to provide a vibration-damping composition that can be cast into a number of shapes to accommodate a wide variety of uses for the composition.

Accordingly, the vibration-damping composition of the present invention provides a material that can be used in a number of different applications and which can be cast into a number of different shapes. The composition is a modified polymer concrete, and more specifically is a polymeric matrix composite of constantly varying acoustic impedance. The composition generally includes a resin, an aggregate, a structural fiber and a filler. These components are combined and are cast into the desired shape and the composition is then allowed to cure or harden. Upon hardening, the composition provides a material that is highly effective in damping unwanted vibrations.

The composition is therefore useful in sound reproduction equipment, such as speakers and amplifiers. The composition is particularly useful in forming speaker cabinets or speaker bases to which the cabinets are attached, as well as amplifier cabinets and bases to which the amplifiers may be attached. Other specific applications of the inventive composition include forming bases for vibration-sensitive measuring and testing equipment, and vibration-reducing pads or feet on which the support structure of a building can rest. Other uses may be made of the composition in applications where external vibrations are unwanted or harmful.

DESCRIPTION OF THE PREFERRED EMBODIMENT

The vibration damping composition of the present invention is a modified polymer concrete. More specifically, the invention is a polymeric matrix composite of constantly varying acoustic impedance. The composition may generally include four components: a resin, an aggregate, a structural fiber and a filler. Materials for the components are chosen so that the composite mix results in a material having a constantly varying acoustic impedance.

Resin is the primary functional component of the composition. The resin cross binds the components of the composition and gives it its moldable characteristics. Further, the resin is the transmission medium for incoming waves, as is more fully discussed below. The preferred resin of the composition is a polyester. The preferred polyester is POLYLITE™ 33130, from Reichhold Chemicals. POLYLITE™ 33130 is a low reactivity, low exotherm thixotropic polyester resin characterized by a viscosity of less than 100 cps, and preferably about 550 cps using a Brookfield model RVF, #2 spindle at 20 RPM, and having 43.5% by weight styrene monomer. The determination of resin for the composition is based, in part, upon the desired structural characteristics of the end composition, the chemical resistant properties of the resin and cost considerations. Other resins such as polyester hybrids, phenolics, vinyl esters, epoxies, acrylics, urethanes and urethane hybrids may also function suitably in the composition. The resin used merely needs to have the ability to hold the remaining components in suspension upon curing. The critical characteristic of the resin used is its viscosity. As the viscosity of the resin decreases, the amount of the other components which can be contained within a given volume increases.

The concentration of the resin within the composition may vary depending on the strength requirements of the structure constructed and the resin selected. Generally, the resin will comprise between about 6 percent and 40 percent by weight of the composition. An exemplary resin concentration for the composition used in a speaker or amplifier cabinet or base is about 37 percent by weight. The viscosity of the resin is preferably less than about 1000 cps. Lower viscosity values of the resin allow the composition greater rigidity and structural strength, while higher values promote greater ease in molding. Further, lower viscosity values allow more of the components below to be added to the composition, thus increasing the vibration damping ability of the composition.

A catalyst is necessary to activate the resin, as is well-known to those of skill in the art. The catalyst selected will depend on the resin used, and the desired curing characteristics of the resin. When POLYLITE™ 33130 is used, a catalyst of nine percent methyl ethyl ketone in a suitable plasticizer is used, such as LUPERSOL™ DDM-9 available from Elf Altochem. Use of this catalyst results in a curing time of approximately two hours.

The aggregates of the composition of the present invention are used for their compressive and displacement characteristics, and as acoustic compliments to the other components of the composition. The displacement quality of the aggregates also allows a smaller amount of resin to be used, which helps to lower the overall cost of the composition. A variety of aggregates can be used in the composition, such as gravel, aluminum trihydrate (ATH) and calcium carbonate. The preferred aggregates are ATH and sand.

The aggregates of the composition can be used individually or in combination. The overall concentration of aggregates within the composition may vary depending on the desired end use of the composition. Preferably, the total aggregate content of the composition is between about 40 percent to 90 percent by weight. An exemplary aggregate content concentration for the composition used in a speaker or amplifier cabinet or base is about 56 percent by weight sand.

Structural fiber is used to increase the strength of the final product and to enhance the acoustical properties of the composition. The structural fiber may be in the form of any fiber capable of achieving these functions, such as glass fiber, aramids and carbon fibers. An exemplary structural fiber for the composition used in a speaker or amplifier cabinet or base is ½ inch glass strand fiber.

The concentration of structural fiber in the composition varies according to desired end use. Typically, structural fiber is present in the composition at concentrations between about 1 percent to 10 percent by weight. Preferably, glass strand fiber comprises about 1.5 to 2 percent by weight of the composition.

The filler component of the present composition may include lead shot, ground rubber, such as vehicle tire particles or other visco-elastomeric compounds. The preferred filler is ground rubber.

The filer component may vary in concentration from 2 to 30 percent by weight of the composition. The preferred embodiment of the composition includes 5.5 percent by weight rubber particles. If the application involves the damping of large amplitude waves, an amount of lead shot equal to the amount of rubber particles can be added to the composition. However, when small amplitude waves are involved, it is not necessary to add additional lead shot.

The method of mixing the components of the vibration damping material is well known to a skilled artisan. More specifically, the catalyst is added to the resin to activate the resin. Prior to adding the catalyst, the resin is preheated to 120° F. Preheating the resin achieves two beneficial results. First, preheating the resin increases the catalyzation rates by making the catalyst more active in the resin. Second, preheating the resin reduces the viscosity of the resin so that more of the other components can be added to the composition. After the catalyst has been added to the resin, the structural fibers are added, followed by the filler and the aggregates. The components are blended together and then poured into a mold so that the desired end shape of the object is achieved. The composition has a cure time of approximately two hours using a POLYLITE™ 33130 resin and the 9% solution of methyl ethyl ketone peroxide as the catalyst. example formulation of the inventive composition is as follows: 1000 g of POLYLITE™ 33130 resin, 20 g of methyl ethyl ketone peroxide in a plasticizer, 40 g of chopped ½ inch glass strand fiber, 150 g of ground rubber particles, and 1500 g of sand. This example is not meant in any way to limit the scope of this invention. As stated above, if a resin having a lower viscosity is used, the amount of the structural fiber, filler and aggregate materials used will increase, but in the same proportions as those given above.

The vibration damping composition of the present invention operates to cancel or "sink" surrounding vibrations to a degree not achieved by existing damping technology. While the specific reason for the improved performance of the present composition is not known, it is believed the superior vibration damping results of the composition are obtained by inverting the phase of incoming waves within the body of the vibration damping composition. By inverting the phase of the incoming wave, the wave is essentially canceled, thereby substantially eliminating unwanted vibration. The composition has been found to achieve its superior results in a wide range of frequencies and under a variety of system conditions.

The composition of the present invention has far-reaching applications. One specific advantageous application for the present composition is in the manufacture of speaker cabinets. The ideal speaker cabinet supports a speaker within a vibration free environment. This allows the speaker to produce sound without also vibrating its supporting structure, which would produce secondary vibrations. A speaker cabinet constructed in whole or in part of the composition of the present invention substantially eliminates unwanted cabinet vibrations. The composition can be used to construct the entire cabinet or just the key components, such as the plinth of the cabinet. Thus, the composition can be used to construct a speaker cabinet without a need for a joints, which further enhances the sound quality of the speaker.

Related vibration problems exist with the use of amplifiers. Therefore, a further contemplated application for the damping composition is an amplifier stand or chassis. The damping composition can be cast into an appropriate shape and thickness, depending on the size and shape of the intended amplifier. When the amplifier is placed on a stand cast from the damping composition of the present invention, the amplifier is isolated from all external vibration. The amplifier chassis constructed of the damping composition would substantially sink the majority of vibration emanating from the amplifier itself.

Yet another application for the damping composition of the present invention includes casting the composition in a form suitable for use as a vibration sink for the support structure of buildings. Use of the composition of the invention in this fashion would increase the structure's resistance to large amplitude vibration frequencies typical of earthquakes. This application of the composition would also seem to be especially effective in sinking out-of-phase harmonics, the most damaging part of an earthquake.

A further contemplated use of the composition of the invention is for tables for vibration-sensitive test equipment, including optical and electronic instrumentation, or for casting in a form suitable for use as a machine tool stand. A related use for the composition is for a motor mount or flooring used in equipment rooms. The motors, generators and other equipment within these rooms produces a large amount of vibration. This vibration is particularly undesirable if the equipment is near measuring equipment, such as on a ship. In this use, the composition may be cast in the form of motor mounts to isolate the vibrations emanating from the motors from the remainder of the ship. Alternatively, the entire deck of the engine room could be cast from the inventive composition.

Other uses of the damping composition of the present invention are contemplated and, therefore, within the scope of this disclosure.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth is to be interpreted as illustrative and not in a limiting sense.

Having thus described the invention, what is claimed is:

1. A modified polymer concrete composition having a strength for forming an article to be used in damping vibrations comprising:

6–40% by weight of a synthetic resin;

40–90% by weight of an aggregate;

1–10% by weight of a structural fiber which increases the strength of the composition; and 2–30% by weight of a filler material comprising lead shot or ground visco-elastomeric particles, said filler being used to reduce the amount of resin.

2. The vibration damping composition of claim 1, wherein the resin is a thixotropic polyester resin having a viscosity of less than 1000 cps.

3. The vibration damping composition of claim 1, wherein the aggregate is selected from the group consisting of gravel, sand, aluminum trihydrate and calcium carbonate.

4. The vibration damping composition of claim 3, wherein both sand and aluminum trihydrate are used as the aggregate.

5. The vibration damping composition of claim 1, wherein the structural fiber is selected from the group consisting of glass fiber, aramids and carbon fibers.

6. The vibration damping composition of claim 1, comprising:

1000 grams of resin;

40 grams of structural fiber;

150 grams of filler material;

1500 grams of aggregate: and further comprising 20 grams of a catalyst for activating said resin.

7. A composition having a strength and acoustical characteristics used in damping vibrations within cabinets for sound reproduction equipment comprising:

6–40% by weight of a synthetic resin;

40–90% by weight of an aggregate;

1–10% by weight of a structural fiber which increases the strength and the acoustical characteristic of the composition; and 2–30% by weight of a filler material comprising lead shot or ground visco-elastomeric particles, said filler being used to reduce;

wherein said resin, upon hardening, suspends said aggregate, said structural fiber and said filler material within the composition.

8. The vibration damping composition of claim 7, wherein the resin is a thixotropic polyester resin having a viscosity of less than 1000 cps.

9. The vibration damping composition of claim 8, wherein the aggregate is selected from the group consisting of gravel, sand, aluminum trihydrate and calcium carbonate.

10. The vibration damping composition of claim 9, wherein both sand and aluminum trihydrate are used as the aggregate.

11. The vibration damping composition of claim 8, wherein the structural fiber is selected from the group consisting of glass fiber, aramids and carbon fibers.

12. A composition having a strength and acoustical characteristics for making components of sound reproduction equipment having a sound quality, comprising:

6–40% by weight of a synthetic resin;

40–90% by weight of an aggregate;

1–10% by weight of a structural fiber which increases the strength and the acoustical characteristic of the composition; and 2–30% by weight of a filler material selected from the group consisting of lead shot and ground visco-elastomeric particles, said filler being used to reduce the amount of resin;

wherein said resin binds the aggregate, the structural fiber and the filler material together, thus forming said composition into a material that can be placed into a mold and that, upon hardening, serves to damp vibrations and increase the sound quality of the equipment.

* * * * *